UNITED STATES PATENT OFFICE.

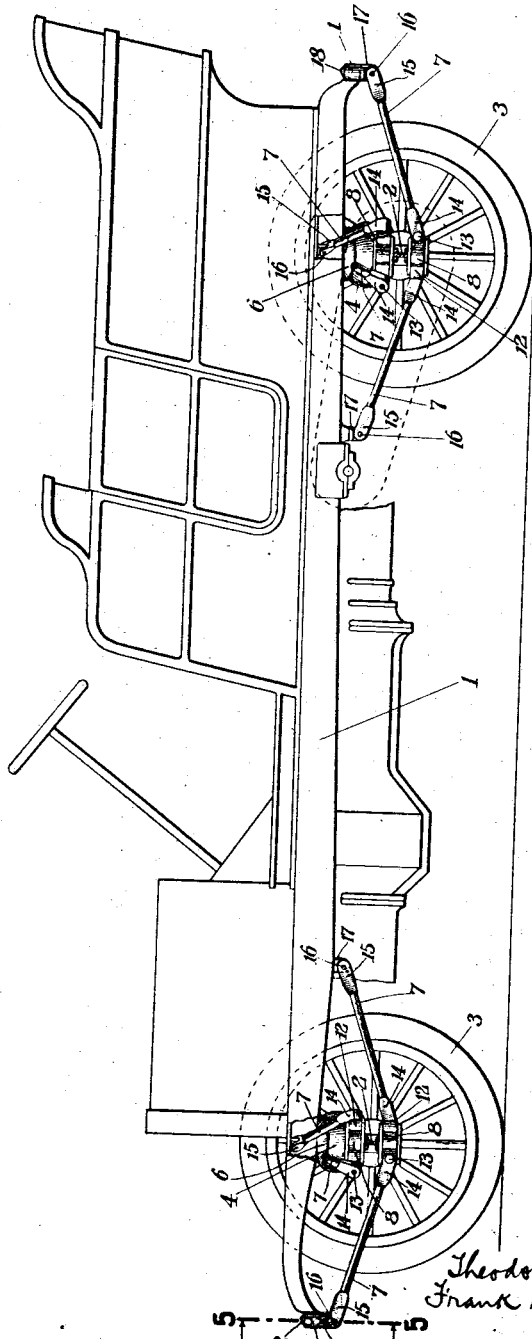

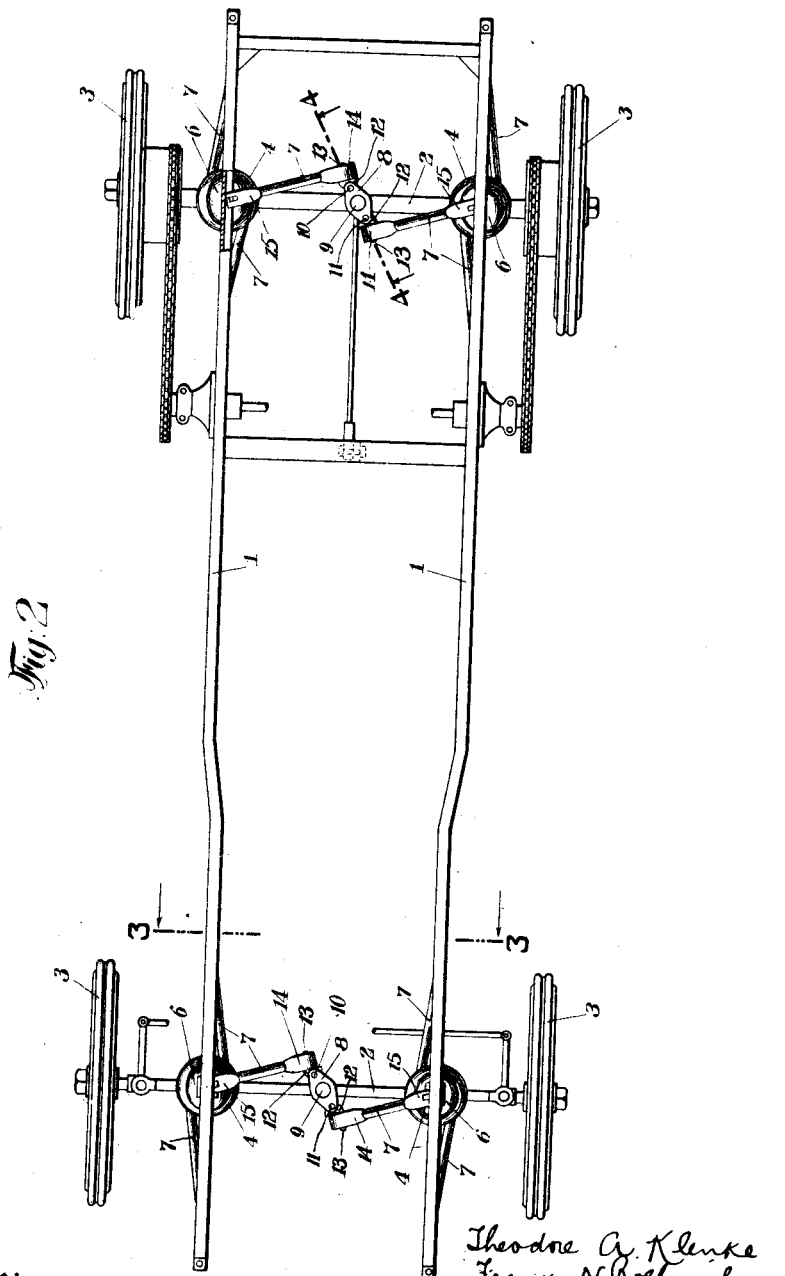

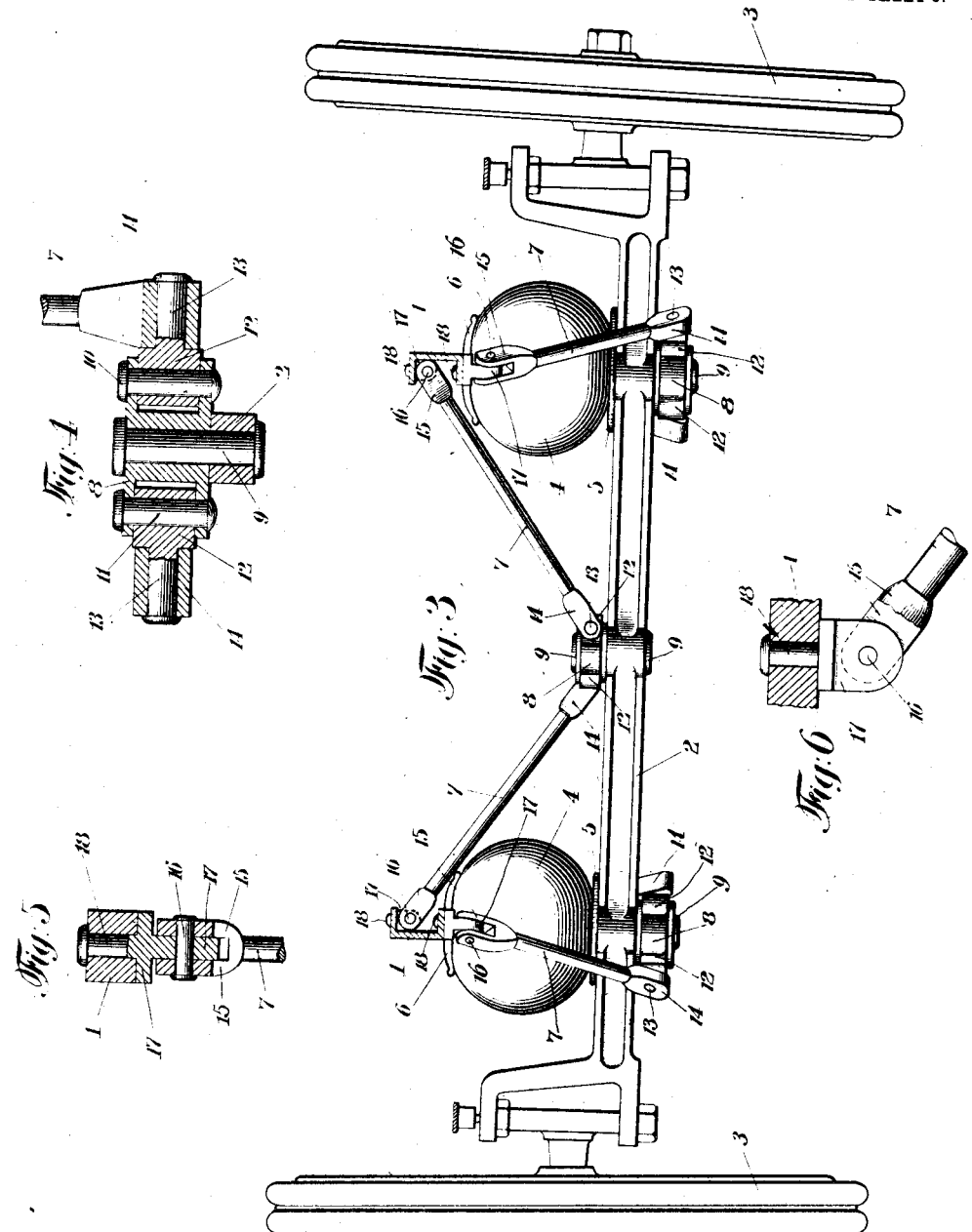

THEODORE A. KLENKE, OF NEW YORK, N. Y., AND FRANK N. ROEHRICH, OF JERSEY CITY, NEW JERSEY, ASSIGNORS TO KLENKE CUSHION AXLE COMPANY, A CORPORATION OF NEW YORK.

VEHICLE SUSPENSION.

1,066,920.  Specification of Letters Patent.  Patented July 8, 1913.

Application filed September 18, 1911. Serial No. 649,945.

*To all whom it may concern:*

Be it known that we, THEODORE A. KLENKE, a citizen of the United States, and a resident of the city, county, and State of New York, and FRANK N. ROEHRICH, a citizen of the United States, and a resident of Jersey City, in the county of Hudson and State of New Jersey, have jointly invented certain new and useful Improvements in Vehicle Suspension, of which the following is a specification.

The object of our invention is to provide new and improved means for suspending the body of a vehicle on the axle so as to prevent displacement of the body relative to the axle laterally or longitudinally, or both, while permitting freedom of motion of the body and axle toward or away from each other, and thus to allow the insertion of pneumatic bags or equivalent cushioning devices between the axle and the body, without any side strains or stresses upon such cushions.

It consists of the novel devices and combinations herein shown and described.

Our invention is peculiarly useful in automobiles, although not limited in use to such class of vehicles.

In the accompanying drawings forming part hereof, we have shown the preferred form of our invention as embodied in the suspension devices of an automobile.

Referring to these drawings, Figure 1 is a side elevation of an automobile containing our improvement, with the nearer wheels and certain of the parts broken away for the sake of clearness; Fig. 2 is a plan of the chassis and axles; Fig. 3 is a vertical section on the line 3—3 of Fig. 2, showing the front axle; Fig. 4 is a vertical section on the line 4—4 of Fig. 2; and Figs. 5 and 6 are detail sections through the universal joint connecting the radius rods with the body, Fig. 5 being a section on line 5—5 of Fig. 1.

Referring to the specific embodiment shown in the drawings, 1 represents the body or chassis of the automobile, 2 the axles, 3 the wheels and 4 the pneumatic bags resting upon the axle and supporting the weight of the body. In our device, the pneumatic bags rest directly upon the axle and are connected directly to the body or chassis, the body and axle being free to move toward or away from each other and the pneumatic bags being variably compressed between them in accordance with such movement. In all such constructions heretofore used, the side strains or stresses in directions at right angles to the direction of movement of the body and axle toward or away from each other, pass through the pneumatic bags tending to tear or disrupture them. Heretofore, it has been found impossible to use such a construction because of such side strains or stresses. In order to eliminate them, we provide suspension connections between the body and the axle, taking all of the side strains and stresses and preventing their passage through the pneumatic bags, while at the same time permitting free movement of the body and axle toward and away from each other. In its complete form as shown in the drawings, we do this by providing a series of sets of radius rods with suitable connections between them and the body on the one side and the axle on the other, permitting the movement of the body and axle toward and away from each other and preventing their relative movement in a direction at right angles to such movement either laterally or longitudinally, or both. Each set of radius rods is composed of two rods arranged between the axle and body, connected to one of those parts at or near the same point, and to the other part at two points on opposite sides of the first mentioned point on the first part, and we provide connections between the said radius rods at their ends and the parts to which they are connected, giving play to the radius rods so as to permit the body and axle to move toward or away from each other, but preventing movement of these parts in a direction at right angles thereto. This permits the pneumatic bags to be variably compressed between the body and axle, but relieves them from all side strains. Referring, now, to the specific means shown in the drawings for accomplishing these purposes, 5 is a plate or support fast to axle 2 for carrying or supporting the pneumatic bag 4.

6 is an upper plate secured to the body 1 resting upon the pneumatic bag and transferring weight from the body to the bag. The connection of the pneumatic bag is thus a direct one with both the axle and body.

The connections between the body and the axle to take care of the strains or stresses in a lateral direction, i. e., parallel to the axle or at right angles to the length of the vehicle, consist of two radius rods 7, 7 suitably connected to the body and to a swinging piece 8 mounted on the axle and adapted to swing freely in a horizontal plane. The radius rods 7 and the swinging piece 8 are connected by pivotal connections preferably a universal joint arrangement, and the radius rods are connected each of them with the body by pivoted connections preferably a universal joint connection, the details of which will be presently described. The two radius rods 7, 7 are connected on opposite sides of the swinging piece 8, as shown in Figs. 2 and 3, and at their other ends, the radius rods are connected to two points of the body or chassis on opposite sides of the swinging piece 8. The arrangement and construction of the swinging piece 8 and its connections with the radius rods 7, 7 are more particularly shown in Figs. 2, 3 and 4. The arrangement on the front axle is precisely the same arrangement as that used on the rear axle. A swinging piece 8 is mounted on each axle 2 midway between the sides of the body 1 and is free to turn on a pin 9 fast to axle 2. Piece 8 carries a pin 10 and a pin 11 each fast with the swinging piece and forming part of it. Each of the radius rods 7 carries at its axle end a piece 12 turning loosely on pin 10 or 11, and each piece 12 has a pin 13 fast with it or forming part of it, upon which the enlarged end 14 of the radius rod loosely turns. Thus, each radius rod is pivotally connected with the swinging piece, preferably, as shown, by a universal joint connection. The connection between each radius rod 7 and the body is a pivotal one, preferably a universal joint connection. That shown is illustrated in detail in Figs. 5 and 6. The upper end of each rod 7 is forked at 15 and each part of the fork 7 encircles or surrounds a pin 16 fast in and forming part of a piece 17. The upper end of piece 17 is rounded at 18 and turns freely in a circular opening in the body 1 of the vehicle. Thus a universal joint connection is furnished between the upper part of each radius rod 7 and the body. This arrangement of radius rods, swinging piece and pivotal or universal joint connections gives lateral play to the radius rods as the body rises and falls relative to the vehicle, or as the body tilts one side or the other, thus permitting free movement of the body and vehicle toward and away from each other or in tilting, but it effectually prevents any displacement of the body relative to the axle laterally of the vehicle and to some extent, also it prevents longitudinal displacement. An exactly similar arrangement of radius rods, swinging piece and connections is used for preventing longitudinal displacement, but in this case each swinging piece 8 is located near one end of the axle, and the radius rods 7, 7 in this case are connected on the same side of the body but on opposite sides of the axle, as shown in Fig. 1; otherwise, the arrangement of the swinging plate 8 and radius rods 7, 7 and their connection with each other and with the axle and body, are exactly the same as above described. This arrangement of radius rods, swinging plate and connections permits vertical movement of the body and axle, but effectually prevents any longitudinal displacement of the body and axle relative to each other. It will, of course, be understood that, preferably, such an arrangement is placed at each end of each axle.

In the embodiment of our invention shown in the drawing, the swinging piece is shown as mounted on the axle and as swinging in a horizontal plane. Our invention, however, is not limited to such a construction, as in certain cases and with suitable modifications, the swinging piece might be mounted on the bed or might swing in a plane other than a horizontal one.

Our invention may be used to prevent either lateral or longitudinal displacement, or both. We prefer to employ it for both purposes, as otherwise the full benefits of the invention are not obtained.

The universal joint connection between the radius rods and the parts with which they are connected, is preferred, although any other suitable connection may be employed that is sufficiently flexible to permit the necessary play of the radius rods, while at the same time preventing displacement of the body and the vehicle relative to each other.

Other modifications than those suggested above may be made without departing from our invention.

What we claim as new and desire to secure by Letters Patent is:

1. In a vehicle, the combination of a body, an axle, a pneumatic bag resting upon the axle and supporting weight of the body, a swinging-piece secured to the said axle so as to move bodily with it in all directions but adapted to swing on the axle, two radius rods connecting the swinging-piece from opposite sides of its pivotal point with two points of the body, a universal joint in the connections between each radius rod and the swinging-piece, and a universal joint in the connections between each radius rod and the point of the body to which it is connected, whereby the body and axle are free to move or to tilt toward or away from each other to vary the compression of the pneumatic bag, but are prevented from moving longitudinally or laterally relatively to each other.

2. In a vehicle, the combination of a body, an axle, a pneumatic bag resting upon the axle and supporting weight of the body, a swinging-piece secured to the said axle so as to move bodily with it in all directions but adapted to swing on the axle in a horizontal plane, two radius rods connecting the swinging-piece from opposite sides of its pivotal point with two points of the body at opposite sides of the swinging-piece, and near and at opposite sides of the pneumatic bag and universal joint connections at each end of each radius rod.

3. In a vehicle, the combination of a body, an axle, a pneumatic bag resting upon the axle and supporting weight of the body, a swinging-piece secured to the said axle so as to move bodily with it in all directions but adapted to swing on the axle, two radius rods connecting the swinging-piece from opposite sides of its pivotal point with two points of the body at opposite sides of the swinging-piece and near and at opposite sides of the pneumatic bag, a universal joint in the connections between each radius rod and the swinging piece, and a universal joint in the connections between each radius rod and the point of the body to which it is connected, whereby the body and axle are free to move or to tilt toward or away from each other to vary the compression of the pneumatic bag but are prevented from moving longitudinally or laterally relatively to each other.

4. In a vehicle, the combination of a body, an axle, a swinging-piece secured to one of these parts so as to move bodily with it in all directions but adapted to swing on said part, a pneumatic bag resting upon the axle and supporting weight of the body, two radius rods connecting the swinging piece from opposite sides of its pivotal point with two points of the other part, universal joint connections between one end of each radius rod and the swinging piece, universal joint connections between the other end of each radius rod and the other part to which said rod is connected, whereby the body and axle are free to move or tilt toward or away from each other but are prevented from moving longitudinally or laterally relatively to each other.

5. In a vehicle, the combination of a body, an axle, a swinging-piece secured to one of these parts so as to move bodily with it in all directions but adapted to swing on said part, a pneumatic bag resting upon the axle and supporting weight of the body, two radius rods connecting the swinging piece from opposite sides of its pivotal point with two points of the other part at opposite sides of the swinging piece and near the pneumatic bag, universal joint connections between one end of each radius rod and the swinging piece, universal joint connections between the other end of each radius rod and the other part to which said rod is connected whereby the body and axle are free to move or tilt toward or away from each other but are prevented from moving longitudinally or laterally relatively to each other.

6. In a vehicle, the combination of a body, an axle, pneumatic bags resting upon the axle and supporting the weight of the body, a swinging piece located on said axle midway between the sides of the body and secured to the axle so as to move bodily therewith but adapted to swing thereon in a horizontal plane, two radius rods connecting the swinging piece from opposite sides of its pivotal point with two points of the body on opposite sides of the swinging piece, and universal joint connections between each end of each radius rod and the part with which it is connected.

7. In a vehicle, the combination of a body, an axle, pneumatic bags resting upon the axle and supporting the weight of the body, a swinging-piece located on said axle midway between the sides of the body and secured to said axle so as to move bodily therewith but free to swing thereon in a horizontal plane, two radius rods connecting the swinging piece from opposite sides of its pivotal point with two points of the body and on opposite sides of the swinging piece, universal joint connections between each end of each radius rod and the part with which it is connected, a swinging piece on said axle located near each end thereof and secured thereto so as to be movable therewith but free to swing on said axle in a horizontal plane, two radius rods connecting each of said last-mentioned swinging-pieces from opposite sides of its pivotal point with two points on the same side of the body but on opposite sides of the pneumatic bag, and universal joint connections between each end of each radius rod and the part with which it is connected, all so constructed and arranged that the body and axle are free to move or tilt toward or away from each other, but are prevented from moving longitudinally or laterally or both relatively to each other, so that the pneumatic bags are compressible between the said axle and the body but are free from any stresses at right angles to the direction of motion of the body and axle toward or away from each other.

8. In the connections between the body and axle of a vehicle, the combination of a plurality of sets of radius rods, each set consisting of two radius rods between the said axle and the body connected to one of these parts at or near the same point and to the other part at two points on opposite sides of the first-mentioned point on the first part, connections between the radius rods at their ends and the parts to which they are connected giving such play to the radius rods as to permit the body and axle to move or to tilt toward or away from each other but to prevent movement of said parts in a direction at right angles to such movement toward or away from each other, and pneumatic bags, one near each set of radius rods resting upon the said axle and bearing the weight of the body, all so arranged that the pneumatic bags may be variably compressed between the said axle and the bag, but will be relieved from strains in a direction at right angles to the direction of movement of the body and axle toward or away from each other.

In testimony whereof, we have signed our names to this specification, in the presence of two subscribing witnesses.

THEODORE A. KLENKE.
FRANK N. ROEHRICH.

Witnesses:
EDWIN SEGER,
GEO. M. HARRIS.